United States Patent [19]
Lim et al.

[11] Patent Number: 6,040,254
[45] Date of Patent: Mar. 21, 2000

[54] DUSTPROOF FABRIC WORN IN A CLEAN ROOM

[75] Inventors: Chang-su Lim, Kyungki-do; Hyeog-ki Kim, Seoul; Sue-ryeon Kim, Kyungki-do; Il-kyoung Kim, Kyoungsanbuk-do, all of Rep. of Korea

[73] Assignee: Samsung Electronics Co., Ltd., Suwon, Rep. of Korea

[21] Appl. No.: 09/168,095

[22] Filed: Oct. 8, 1998

[30] Foreign Application Priority Data

Dec. 24, 1997 [KR] Rep. of Korea ........................ 97-73509

[51] Int. Cl.⁷ ........................................................ B32B 3/00
[52] U.S. Cl. .......................... 442/261; 442/203; 442/217; 442/286; 442/304; 428/196; 428/197; 428/198
[58] Field of Search ....................... 442/187, 217, 442/255, 261, 286, 304; 428/196, 197, 198

[56] References Cited

U.S. PATENT DOCUMENTS 4,435,458  3/1984  Hill ............................................. 428/91
5,520,980  5/1996  Morgan et al. ........................ 428/246

*Primary Examiner*—Christopher Raimund
*Attorney, Agent, or Firm*—Jones Volentine, LLP

[57] ABSTRACT

A dust-proof fabric is disclosed. The fabric comprises an inner knit fabric layer, an intermediate layer of a moisture absorbent polyurethane film and a high density woven polyester fabric outer layer. The outer layer contains a first set of spaced apart conductive yarns aligned with one another in the warp direction and a second set of spaced apart conductive yarns aligned in the weft direction.

17 Claims, 5 Drawing Sheets

DUSTPROOF FABRIC WORN IN A CLEAN ROOM

BACKGROUND OF THE INVENTION

1. Field of the Invention

The present invention relates to a dustproof fabric and to a method of manufacturing the same. More particularly, the present invention relates to a dustproof smock worn by technicians in the clean room and to a method of manufacturing the fabric of the smock.

2. Description of the Related Art

Clean rooms are being used more often in a great number of different areas including semiconductor fabrication facilities. The requirements for maintaining cleanliness in semiconductor fabrication clean rooms are stringent. Even the smocks worn by technicians in clean room environments must be carefully designed and manufactured to prevent the clean room from being contaminated by dust or moisture emanating from the bodies of the technicians themselves (now referred to as "particles").

The first semiconductor devices to be manufactured were not nearly as highly-integrated as the semiconductor devices which are manufactured today. In the past, the clean rooms were maintained at a cleanliness class level of between 10 k and 100 k, and the smocks worn by the technicians in the clean rooms were made of nylon or polyester taffeta.

However, the semiconductor device fabrication process continues to become more and more affected by the environmental conditions existing in the place in which the process takes place. Such conditions include the level of particulate contaminants, the electrostatic level of the air, etc. Accordingly, more attention has been paid to the material of the smocks worn by the technicians in the clean room. In this respect, polyester smocks have been adopted for use in the clean room.

Recently, highly integrated semiconductor devices having critical dimensions on the order of sub-microns, such as the 64M DRAM, 256M DRAM, etc., have been developed. The clean rooms in which such devices are made must be maintained at a cleanliness class of less than 10 k. This requirement has brought about an even greater scrutiny of the fabric from which the clean room smock is made.

Even the ultra-fine filaments of the nylon taffeta or polyester taffeta of the conventional clean room smocks could not prevent an unsatisfactory amount of moisture or fine particulates from emanating from workers' bodies into the clean room environment. The warp and weft of such fabric is just too great. Therefore, such fabric was treated with a moisture-permeable and water-proof, water-repellent coating or laminate of polyurethane resin or fluoric resin. Fabric treated in this way is shown in FIG. 1, and is manufactured by The Dupont Company of Delaware under the trademark GORETEX.

Referring now to FIG. 1, a polyester fabric 3 woven from aligned conductive yarns 2 is coated with a polyurethane and/or fluoric resin film 1. As shown in FIG. 2, particles emanating from one's body cannot pass through the coated resin film 1, but moisture from the body can pass through fine pores of the fabric. Accordingly, the fabric is moisture-permeable. On the other hand, water molecules having a relatively large size cannot permeate the pores 14 of the coating layer 15 and may become stuck. Thus, the moisture permeability decreases, and the comfort level of wearing the fabric is somewhat compromised. The comfort level is even lower when the resin layer 1, 15 is located at the side of the fabric which contacts the skin.

SUMMARY OF THE INVENTION

An object of the present invention is to overcome one or more of the problems, limitations and disadvantages of the related art.

Accordingly, a first specific object of the present invention is to provide a dustproof fabric which is impermeable to particles of 0.1 microns or larger.

Another specific object of the present invention is to provide a dustproof fabric having a relatively high degree of water-permeability and which is very comfortable when worn.

To achieve these objects, the dustproof fabric of the present invention comprises three integrated layers. The inner layer is of a knitted fabric. The intermediate layer is formed of a non-micro porous polyurethane resin exhibiting a high degree of moisture absorbency. The outer layer is formed of a high density polyester woven fabric having warps and wefts of respective sets of spaced apart conductive yarns.

The knit fabric of the inner layer is preferably a warp-knitted fabric of nylon tricot having good strength and resilience.

The intermediate layer and the inner layer are preferably attached by dots of hot-melt adhesive so that the fabric retains a sufficient degree of flexibility. On the other hand, the intermediate layer and the outer layer can be attached by dots or by a thin coating of adhesive.

The high density polyester woven fabric of the outer layer may also comprise ultra-fine yarns having a filament denier of 0.1 or less. Such yarns can be produced by the so-called sea and island type or separation type of conjugate spinning.

As far as the pattern of the high-density polyester woven fabric of the outer layer is concerned, a 2/1 Twill and in particular, a Herringbone twill is preferable.

The objects of the invention are also achieved by a method of manufacturing a dustproof fabric comprising the steps of: (a) manufacturing a woven fabric, having a warp density of 140 to 170 yarns per inch and a weft density of 90 to 130 yarns per inch, from polyester yarns having a yarn denier in a range of 50 to 100 and conductive yarns having a yarn denier in a range of 15 to 30, with the conductive yarns aligned with one another and spaced apart in both the warp and weft; (b) coating release paper with non-micro porous polyurethane resin exhibiting a high degree of moisture absorbency, attaching the woven fabric to the polyurethane, and drying the same (c) aging the integrated layers sufficiently to facilitate a cross-linking reaction in the polyurethane resin layer, and detaching the release paper therefrom; and (d) attaching nylon knit fabric to the polyurethane layer, and aging the same.

In addition, the high-density woven fabric of the outer layer is preferably subjected to an anti-static treatment of a per se known type.

A clean room smock of the fabric described above is made dustproof by the polyurethane film provided on the high-density woven fabric.

In fact, ultra-fine particles from the human body, which range in size from 0.001 to 0.1 $\mu$m, are prevented from passing through the smock by the intermediate layer of polyurethane film according to the present invention.

Moreover, because of the high degree of moisture permeability exhibited by the polyurethane layer, a smock made from the dustproof fabric is very comfortable to wear.

BRIEF DESCRIPTION OF THE DRAWINGS

These and other objects, features and advantages of the present invention will become more apparent from the following detailed description of preferred embodiments thereof made with reference to the accompanying drawings, of which.

DETAILED DESCRIPTION OF THE PREFERRED EMBODIMENTS

Figure 1:
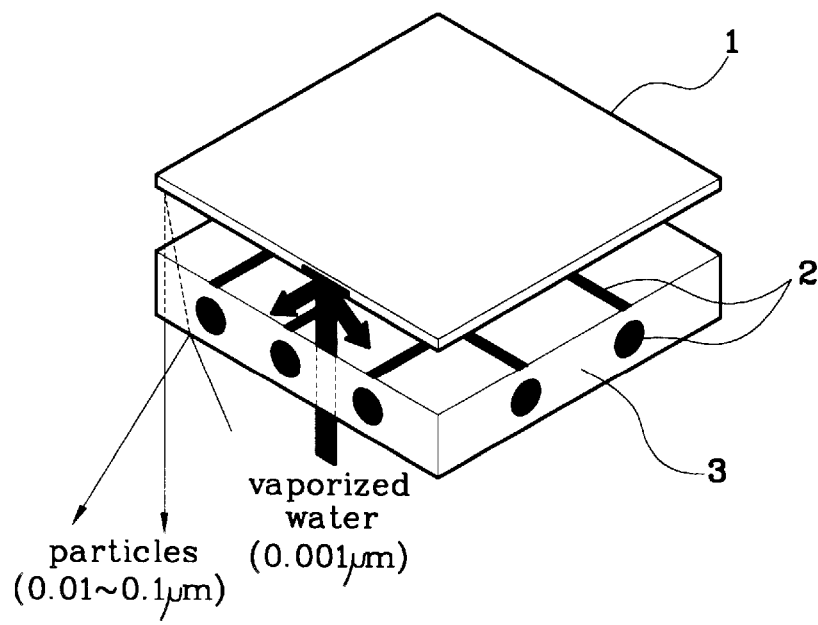
FIG. 1 is a schematic diagram of a conventional dustproof fabric for use in a clean room in which a semiconductor device fabrication process takes place.
Figure 2:
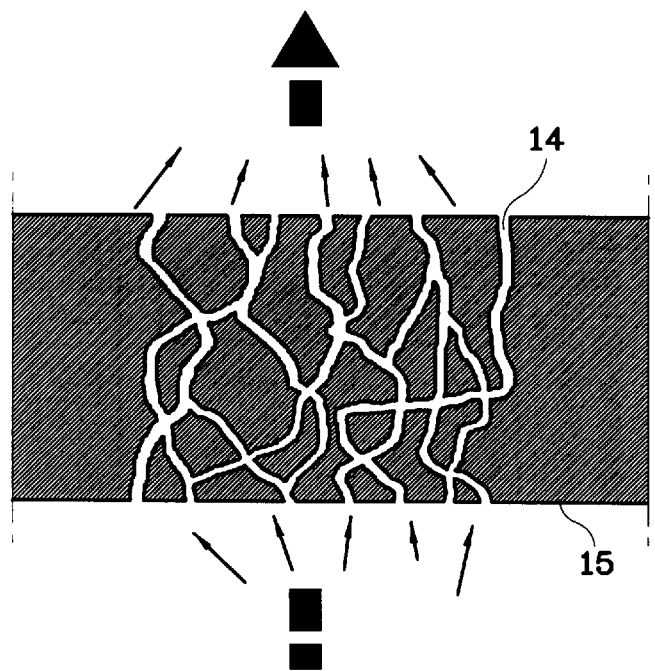
FIG. 2 is a schematic diagram of a cross-sectional view of the coating of the conventional dustproof fabric and showing moisture molecules passing through the coating.
Figure 3:
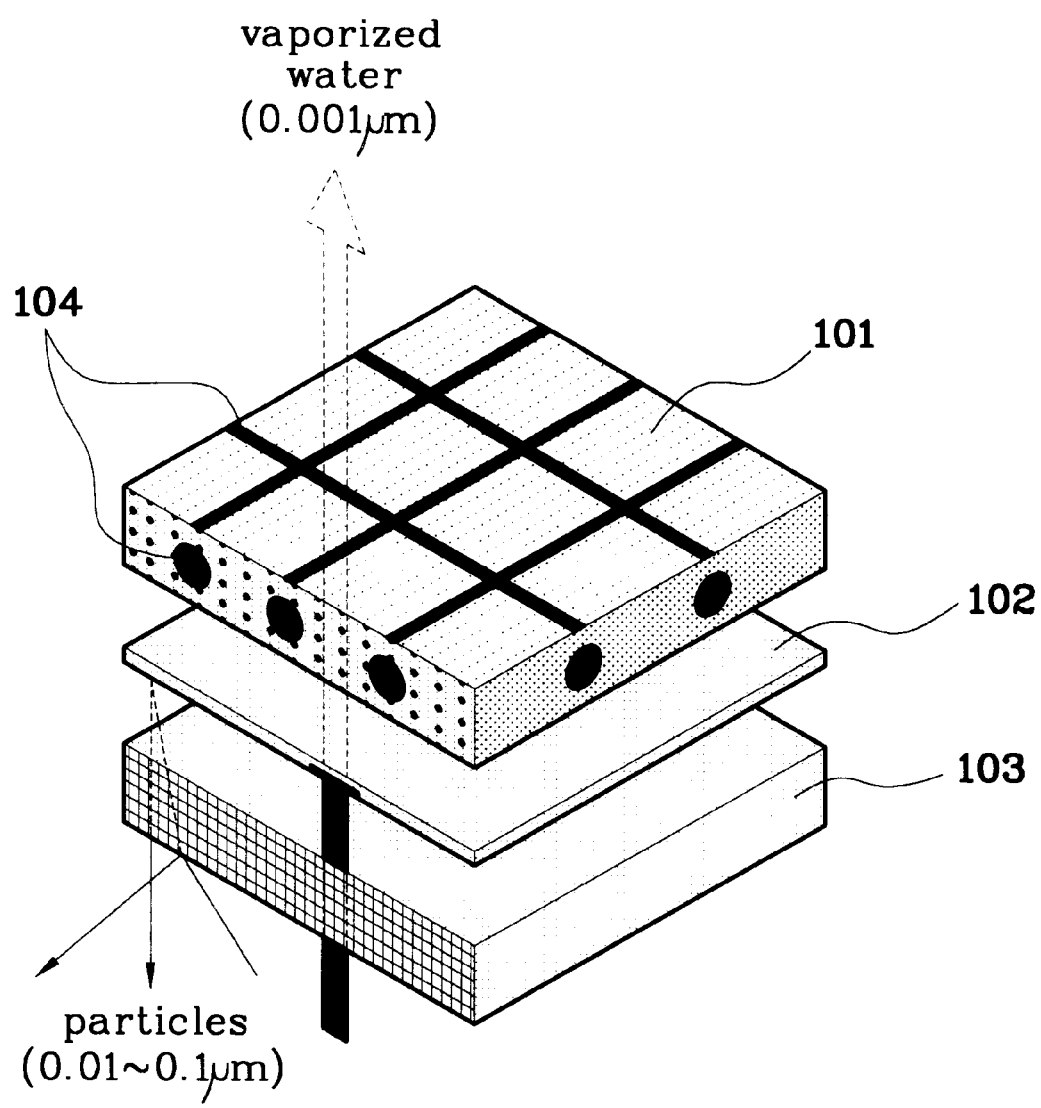
FIG. 3 is a schematic diagram of the dustproof fabric for use in a clean room according to the present invention.

Referring first to FIG. 3, the dustproof fabric comprises an inner layer 103 of a knit fabric, an intermediate layer 102 and an outer layer 101. The outer layer 101 is a high density polyester woven fabric. Besides polyester filaments and ultra-fine yarns having a filament denier of at most 0.1, the fabric of the outer layer 101 is formed of conductive yarns 104 aligned with one another in the directions of the warp and weft and slightly spaced apart from each other in each of such directions. The weaving density T of the outer layer 101 is in a range of 230 to 300 (wherein T is the sum of the numbers of filaments per inch in each direction of the warp and weft, and is an industry norm for designating density). The high density woven fabric is extremely dustproof because it has a low degree of porosity.

Various types of conductive yarn 104 can be employed in the outer layer of the high density woven fabric of the present invention. Such yarns include those having a core filament whose surface is covered with carbon, and those whose filaments are impregnated with carbon by means of conjugate spinning, etc. The spacing of the conductive yarns 104 in the warp and weft of the outer layer is preferably in a range of 0.3 to 1 cm, in consideration of weaving efficiency and of achieving satisfactory conductivity.

The denier of the polyester filaments of the woven fabric of the outer layer 101 is within a range of 50 to 100, whereas the denier of the conductive yarns 104 of the fabric is within the range of 15 to 30, which ranges are also preferable in consideration of the weaving efficiency and conductivity.

The polyester woven fabric has a 2/1 Twill structure, and preferably is of a Herringbone twill, which is a highly resilient and highly dense structure.

The intermediate layer 102 of the dustproof fabric is situated under the outer layer 101. The intermediate layer 102 comprises a non-micro porous polyurethane resin film exhibiting a high degree of moisture absorbency. The polyurethane resin is preferably one selected from the ester group or the ether group. An adhesive layer is interposed between the outer layer 101 and the intermediate layer 102. The adhesive layer should be as thin as possible so as not to unduly decrease the water-permeability of the structure. The adhesive can alternatively be in the form of dots provided by a dot-bonding method known per se.

As a result, moisture or sweat emanating from a human body and passing through the knit fabric of the inner layer 103 is absorbed by the high-density polyurethane resin film of the intermediate layer 102. There, the moisture or sweat is allowed to evaporate into molecules. These molecules are so small (0.001 $\mu$m or smaller) that they will not function to contaminate the semiconductor device fabrication process once they pass through the polyurethane resin film and are discharged from the outer layer 101 into atmosphere.

The knit fabric of the inner layer 103 and the intermediate layer 102 are preferably attached by adhesive applied by dot-bonding. A hot-melt adhesive can be used for this purpose.

Figure 4:
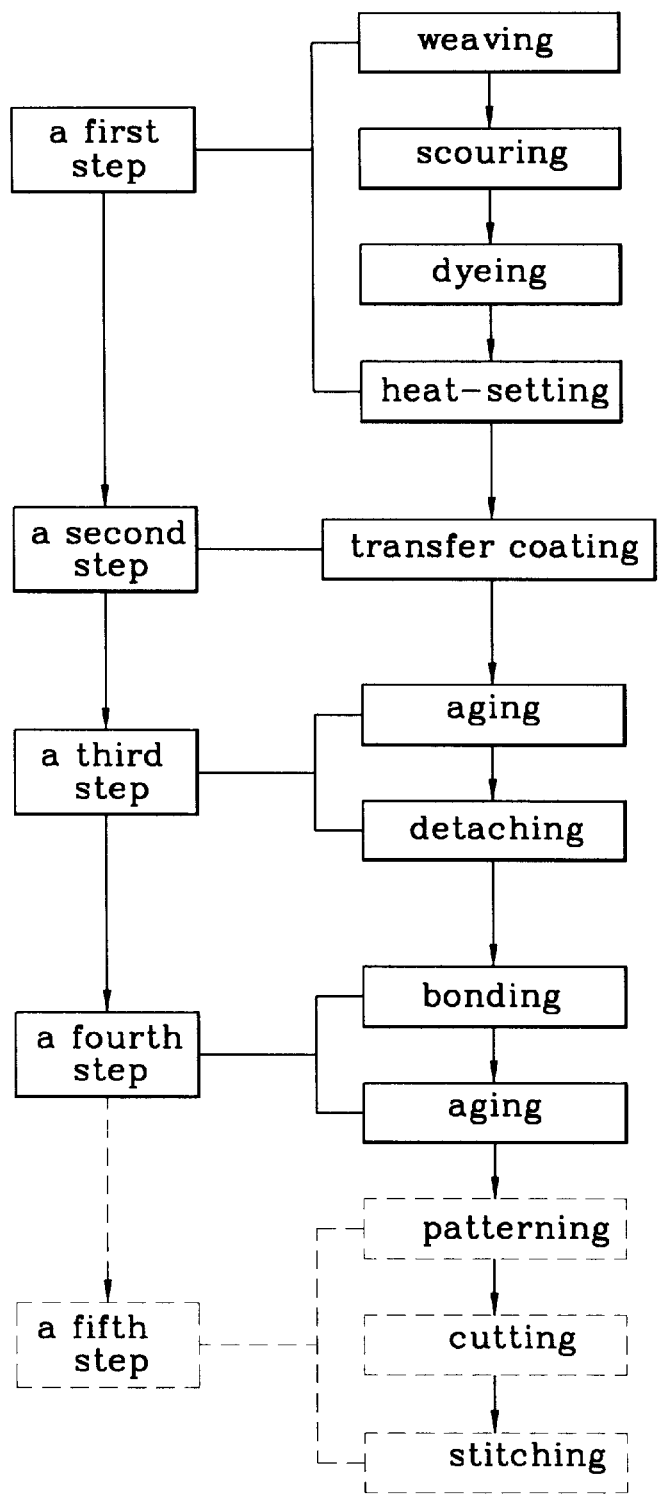
FIG. 4 is a block diagram of the sequences of steps of the method of manufacturing the dustproof fabric according to the present invention.
Figure 6:
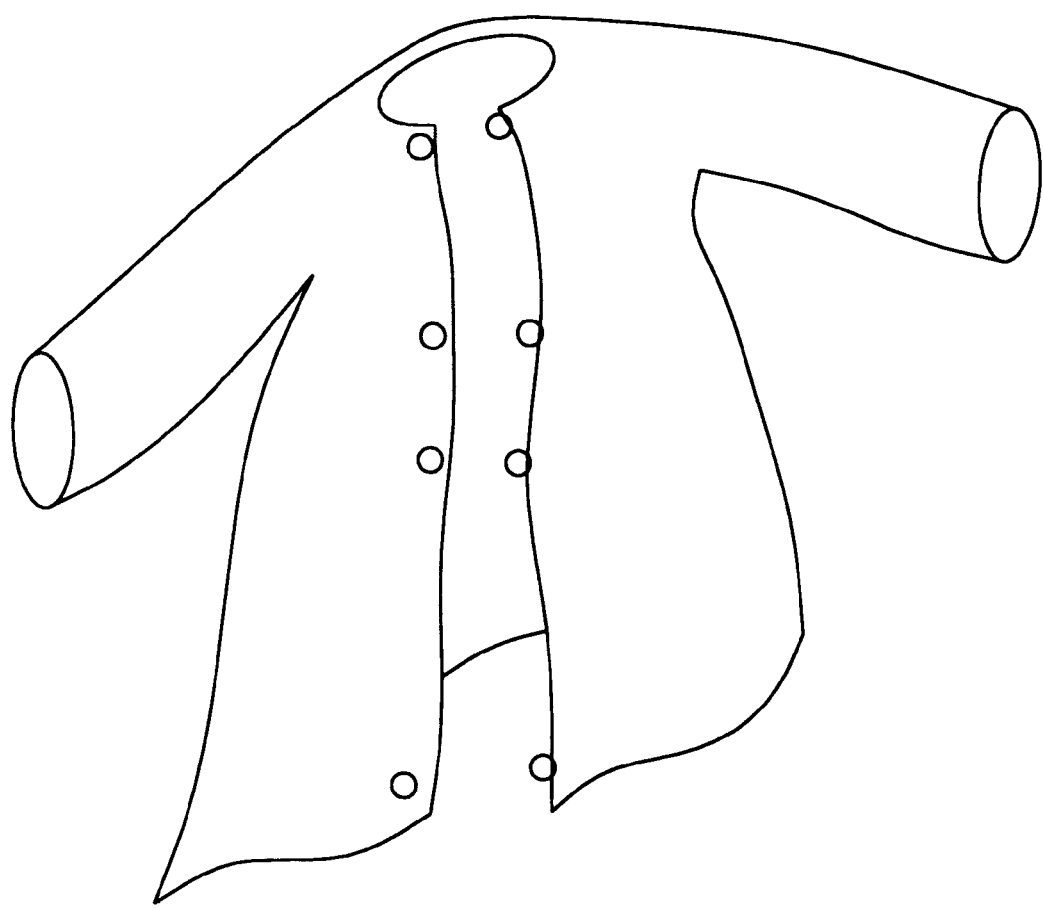
FIG. 6 is a perspective view of a smock.

Referring now to FIG. 4, the dustproof fabric is manufactured by first manufacturing the high-density polyester woven fabric of the outer layer, and secondly by manufacturing the high moisture-absorbency polyurethane resin film of the intermediate layer using a transfer coating technique in which the resin is coated on a release paper. Then, the outer layer and the intermediate layer are adhered to one another. The method is completed by attaching the knit fabric of the inner layer to the intermediate layer. As shown by the dotted lines, a smock can be made from such fabric by the conventional techniques of manufacturing clothing from fabric. Such techniques may include first providing a pattern of the smock (or certain segments thereof) on the dustproof fabric/pieces of fabric, cutting the dustproof fabric/pieces of fabric along the pattern, and stitching or otherwise securing the cut pieces of fabric together to form the smock. FIG. 6 shows such a smock but the present invention is in no way intended to be limited to the specific shape/size/design of the smock depicted in the figure.

Describing the method in more detail, the high-density polyester woven fabric of the outer layer is first woven, and then scoured, dyed, and is heat-set, i.e. dried (first step in the overall manufacturing process).

Next, a sheet of release paper is coated with a layer (skin) of polyurethane resin having a high degree of moisture absorbency to produce the film of the intermediate layer. This layer is attached to the high-density polyester woven fabric. Heat is then applied to cause the resin to set, whereby the second overall step in the manufacturing process is completed.

Next, the adhered outer layer and intermediate layer are aged. Afterwards, the release paper is detached from the polyurethane resin (third overall step).

Finally, the knit fabric is bonded to the intermediate layer, and the integrated layers are aged (fourth step).

The weaving which is part of the first step is carried out by a conventional water jet loom. Such a loom is capable of producing a Twill, especially a 2/1 Twill such as a Herringbone Twill, previously referred to as the most preferable form of the outer layer 101.

Because the polyester yarn forming the warp and weft of the polyester woven fabric of the outer layer, and the conductive yarn of the same layer have different filament deniers, the strength and elongation of the polyester and conductive yarns are different. Accordingly, the tension applied to the warp and weft during weaving must be carefully controlled. In the fabric of the present invention, the warp density is in a range of 140 to 170 filaments per inch, and the weft density is in a range of 90 to 130 filaments per inch. Accordingly, the fabric has a high density in a range of 230 to 300 T. In addition, the denier of the polyester yarns ranges from 50 to 100, and the denier of the conductive yarns ranges from 15 to 30. Within these ranges, the fabric can be woven easily, i.e. with high efficiency, and yet the resultant fabric is comfortable to wear. The scouring, dying, and heat-setting can be effected by conventional techniques used for processing polyester.

In order to enhance the resiliency of the fabric of the outer layer 103 and its adhesion to the resin of the intermediate layer 102, the polyester yarn is of a draw-twisted type. Furthermore, the fabric of the outer layer 103 can be subjected to an anti-static treatment after it has been dyed to minimize its ability to generate static electricity.

As previously mentioned, the polyurethane resin of the intermediate layer 102 is non-micro porous and exhibits a high degree of moisture absorbency. In particular, those polyurethane resins in the hydrophilic ester or ether group are preferable. It should also be noted that conventional transfer coating machines are suitable for carrying out the second step of the method of the present invention, i.e. the formation of the film of polyurethane resin.

Regarding the third step, the integrated layers are preferably allowed to age at a temperature of 50 to 80° C. for over 15 hours. Such conditions are sufficient to facilitate a cross-linking reaction in the polyurethane resin film.

Regarding the fourth step, the integrated layers are also preferably aged at a temperature of 50 to 80° C. for over 15 hours. The knit fabric of the inner layer 103 is preferably dot-bonded to the intermediate layer 102 in order to ensure that the final product is sufficiently flexible for use as clothing.

Figure 5:
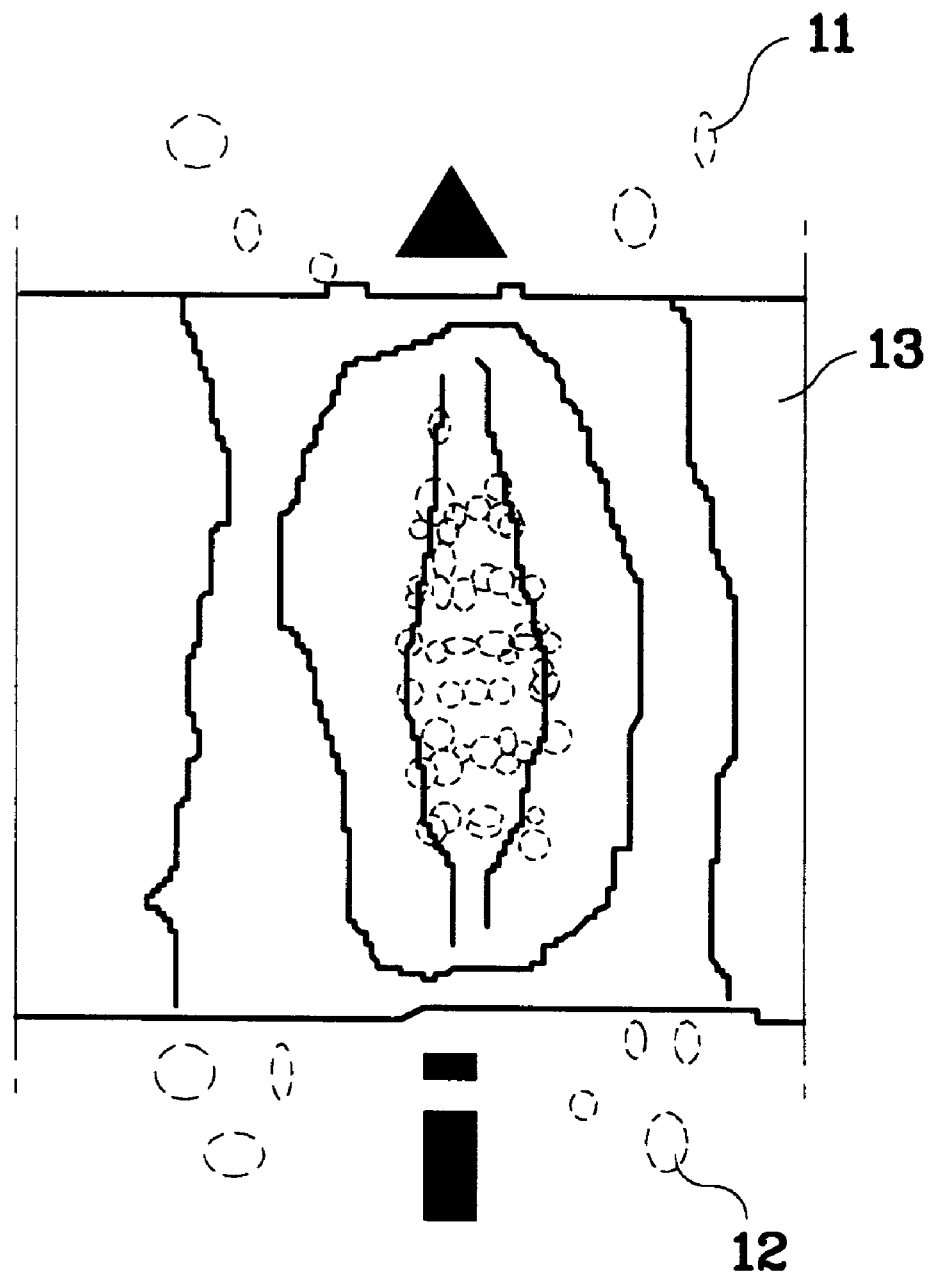
FIG. 5 is a schematic diagram of a cross-sectional view of the coating of the dustproof fabric according to the present invention and showing moisture molecules passing through the coating of the fabric.

FIG. 5 is a model of the present invention showing that molecules of moisture will pass through the intermediate layer of the dustproof fabric of the present invention. Unlike the prior art, in which water particles are discharged through fine pores, particles of moisture 12 are absorbed by the coating 13 (representing the intermediate layer 102), diffuse toward the outside, and are discharged as molecules 11. That is, the present invention actually reduces the size of the potential contaminants before they are allowed to pass through the fabric. Accordingly, a blockage of the pores can also be prevented.

Now, a specific embodiment of the present invention will be described in detail. It should be understood that this embodiment is provided only as an example of the present invention, and is not meant to limit the same.

EXAMPLE

The high-density woven fabric of the outer layer was manufactured by a water jet loom, and the space between the conductive yarns in both the warp and the weft was 0.6 cm. The polyester filaments of both the warp and weft were of 70 denier, and the conductive yarns were of 20 denier. The weaving density was 165×115. The woven fabric was a 2/1 Twill.

The raw fabric was scoured in a consecutive scouring machine at a temperature of 90° C. at 60 mpm, dyed white using a circular dying machine, and heat-set in a tenter at a temperature of 140° C. at 60 m/min.

A flat sheet of release paper was coated with a non-micro porous polyurethane resin of the ester group at a temperature of 110 to 120° C. at 20 m/min. by using a consecutive coating machine. The result was in turn coated with an adhesive. Then, the high-density woven fabric and the polyurethane resin coated with adhesive were compressed between rollers to adhere them together. The resulting structure was aged at a temperature of 60° C. for 24 hours to facilitate a cross-linking reaction in the urethane resin.

The release paper was then removed. A nylon tricot Smith knitted fabric was dot-bonded to the surface from which the release paper had been removed. The resulting structure was aged at a temperature of 60 to 70° C. for 24 hours, thereby completing the manufacture of the dustproof fabric.

The following table offers a comparison of the characteristics of the dustproof fabric of the present invention and the fabric of the prior art.

TABLE

| | Fabric Comparison | | | | | |
|---|---|---|---|---|---|---|
| | particle shield | moisture permeability | resistance | film strength | resilience | air permeability |
| dustproof fabric of the embodiment | over 99.9% for 0.1 μm particle | 10000 | Δ | ⊙ | ⊙ | 0.11 |
| conventional dustproof fabric | over 99% for 0.3 μm particle | 8000 | Δ | Δ | Δ | less than 0.05 |

In the above table, the moisture permeability was detected by a potassium acetate method (KSK 0594 standard), and the air permeability was detected by the Frazier method (KSK 0570). The symbol "Δ" represents an average performance value, and the symbol "⊙" represents an above-average performance value.

A clean room smock made of the dustproof fabric of the present invention can be used in a clean room in which highly integrated semiconductor devices are produced. Such a smock will not allow such an environment, which must be maintained at a cleanliness class of less than 10 for particles of 0.1 to 0.001 μm, to be contaminated.

The clean room smock according to the present invention is very comfortable because moisture from the body passes easily through the smock. The clean room smock is also made dustproof by the polyurethane film provided on the high-density woven fabric, and due to the anti-static treatment of the woven fabric and the corona discharge facilitated by the aligned conductive yarn.

In fact, ultra-fine particles from the human body, which range in size from 0.001 to 0.1 μm, are prevented from passing through the smock by the intermediate layer of polyurethane film according to the present invention.

Although the present invention has been described in detail, various changes, substitutions and alterations thereto will become apparent to those of ordinary skill in the art. All such changes, substitutions and alterations are thus seen to be within the true spirit and scope of the invention as defined by the appended claims.

What is claimed is:

1. A dustproof fabric comprising:
   an inner layer comprising a knit fabric;
   an intermediate layer attached to said inner layer and comprising a non-micro porous and moisture absorbent polyurethane resin film; and
   an outer layer attached to said intermediate layer opposite said inner layer, said outer layer comprising a high density woven fabric of polyester yarns, a first set of spaced apart conductive yarns aligned with one another in the direction of the warp of the woven fabric, and a second set of spaced apart conductive yarns aligned with one another in the direction of the weft of the woven fabric.

2. The dustproof fabric of claim 1, wherein said knit fabric of the inner layer is a warp-knitted fabric of nylon tricot.

3. The dustproof fabric of claim 1, wherein said intermediate layer and the inner layer are attached by dots of adhesive.

4. The dustproof fabric of claim 1, wherein said intermediate layer and said outer layer are attached by dots of adhesive.

5. The dustproof fabric of claim 1, wherein said woven fabric comprises yarns having a filament denier of at most 0.1.

6. The dustproof fabric of claim 1, wherein said polyurethane resin is selected from a group consisting of ether and ester based resins.

7. The dustproof fabric of claim 1, wherein said polyester woven fabric has a Twill structure.

8. The dustproof fabric of claim 1, wherein the fabric has a moisture permeability of 10,000 as measured by a standard potassium acetate method.

9. The dustproof fabric of claim 1, wherein the fabric has an air permeability of 0.11 as measured by a standard Frazier method.

10. The dustproof fabric of claim 8, wherein the fabric has an air permeability of 0.11 as measured by a standard Frazier method.

11. The dustproof fabric of claim 1, wherein said woven fabric has a density in a range of 230 to 300 T.

12. The dustproof fabric of claim 8, wherein said woven fabric has a density in a range of 230 to 300 T.

13. The dustproof fabric of claim 9, wherein said woven fabric has a density in a range of 230 to 300 T.

14. The dustproof fabric of claim 10, wherein said woven fabric has a density in a range of 230 to 300 T.

15. The dustproof fabric of claim 1, wherein said conductive yarns are spaced from one another by 0.3 to 1 cm.

16. The dustproof fabric of claim 11, wherein said conductive yarns are spaced from one another by 0.3 to 1 cm.

17. The dustproof fabric of claim 1, wherein said polyester yarns are draw-twisted.

\* \* \* \* \*